Figure 1:
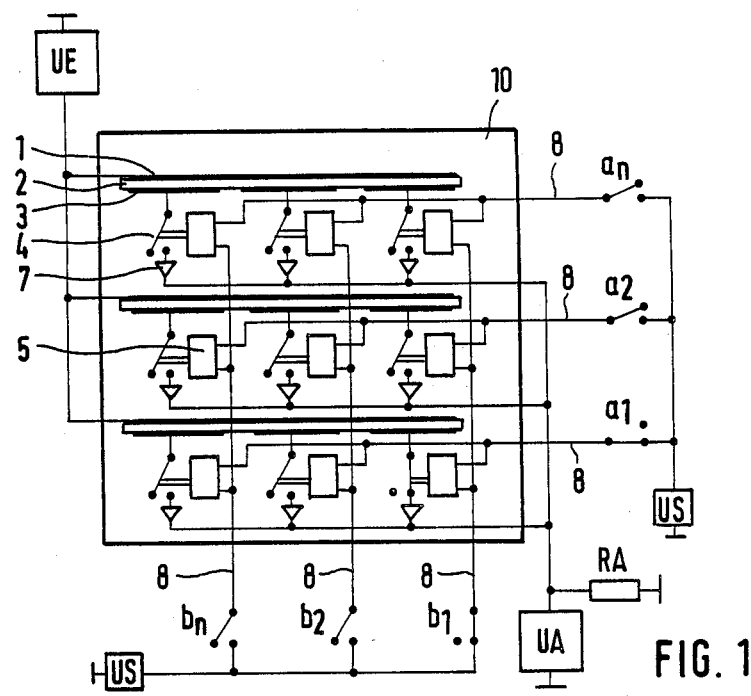

United States Patent [19]

Brunner et al.

[11] Patent Number: 4,843,891

[45] Date of Patent: Jul. 4, 1989

[54] SYSTEM FOR MEASURING FORCE DISTRIBUTIONS

[76] Inventors: Wolfgang Brunner; Ludwig von Zech, both of Ringenberg 175, 8999 Maierhöfen, Fed. Rep. of Germany

[21] Appl. No.: 127,066

[22] Filed: Dec. 1, 1987

[30] Foreign Application Priority Data

Dec. 10, 1986 [DE] Fed. Rep. of Germany ....... 3642088

[51] Int. Cl.$^4$ ............................ G01L 5/16; G01L 1/14
[52] U.S. Cl. .................................................. 73/862.04
[58] Field of Search ................. 73/862.04; 340/365 A

[56] References Cited

U.S. PATENT DOCUMENTS

| | | |
|---|---|---|
| 3,816,826 | 6/1974 | Masuda et al. ................. 340/365 A |
| 4,539,554 | 9/1985 | Jarvis et al. ..................... 73/862.04 |
| 4,695,963 | 9/1987 | Sagisawa et al. ................ 73/862.04 |

*Primary Examiner*—Charles A. Ruehl
*Attorney, Agent, or Firm*—Max Fogiel

[57] ABSTRACT

System for measuring force distributions with individual force-measurement sensors that can be polled in sequence, providing a high level of mechanical and electric security against interference at a low cost in circuitry and controls. The measurement-sensor matrix can be designed to prevent crosstalk between the measurement sensors.

12 Claims, 2 Drawing Sheets

SYSTEM FOR MEASURING FORCE DISTRIBUTIONS

The measurement of force distributions with a sensor matrix emtails the problem that a large number of sensors must be included, whereby the number of multiplexer channels and incoming leads must at least equal that of the sensors. This makes the technology and electronics very expensive.

To counteract this problem, German Pat. No. 2 529 475 discloses a device for measuring force distributions wherein the circuitry and control expenses are considerably decreased by combining the sensor input and output terminals into lines and rows.

A drawback to this system is that not only one sensor but a chain of parallel sensors affects the measurement signal during measurement and hence occasions crosstalk between the individual sensors.

To keep this malfunction as slight as possible, the resistance in the voltage divider must be kept small in relation to the resistance or blind resistance in the sensor while the measurement signal is being picked up. This, however, decreases the dimension of the useful signal. Furthermore, the line-by-line incorporation of the sensor connections and their requisite screening devices results, especially in capacitative sensor systems, in problems at the force-introduction end in conjunction with the mechanical disconnection and strength of the system. German Nos. 3 025 362 and 3 411 528 describe these problems and requisite countermeasures. Sensors that emit an electric signal on their own subject to the action of a force cannot be employed in that system.

The object of the invention is to create a device for measuring force distributions at a justifiable circuitry and control expense, whereby in particular the number of leads entering the measurement matrix is very low in relation to that of the sensors. The interactions of the sensors due to mechanical or electric connections are intended to be few in comparison to known systems. Furthermore, the reliability of the sensors in relation to electric and mechanical disturbance and the system's interference-signal distance are intended to be high in relation to known measuring systems. The system is appropriate for sensors that are activated by switching in an electric signal or that themselves emit an electric signal when acted on by a force.

This is attained in that one connection of the force sensors in one measurement matrix is connected to all the other connections in the same position and the other connection is connected to a switch that is spatially directly adjacent to the measurement matrix sensor.

The switches are controlled and are individually or in groups activated from outside the measurement matrix by a number of control lines that is much smaller than that of the measurement sensors. The individual measurement sensors can be connected along with a resistor into a voltage divider, from which each measurement signal is picked up and processed. The voltage divider can be dimensioned in any way desired in order to increase the useful signals. If measurement sensors that do not automatically emit an electric signal when subjected to force are employed, a signal voltage must be applied.

Using impedance converters directly positioned in the vicinity of the measurement sensors and which can consist in conjunction with the switches of one electronic component each makes it possible to attain very high reliability against disturbance.

The measurement sensors can be constructed very simply by creating the common measurement-sensor connections at the force-introduction end out of an essentially integral electrically conductive surface and the connections to the switches out of individual conductive surfaces. Between these measurement-sensor connections there can be, if the measurement sensors are capacitive for example, a compressible dielectric. When a force is introduced, the capacity of the individual capacitors will increase.

The conductive surface of the force-introduction end can, by appropriately wiring the system, be connected to ground potential, in which case no screening will be necessary. This will facilitate a resilient embodiment of the force-introduction end of the measurement sensors, preventing mechanical crosstalk between the sensors. If the resilient dielectric is replaced with a piezoelectric or pyroelectric layer or with a material that varies in resistance, the creation of simple measurement-sensor systems will be facilitated.

Other possibilities consist for example of using force-embodiment sensors with variable inductivities or magnetic fields.

The system in accordance with the invention can be employed in medicine to detect force distributions between human bodies and supporting surfaces. Other applications derive for example from the design of pressure-sensitive keyboards or buttons.

Various embodiments and the precise function of the system in accordance with the invention will now be explained with reference to the example of capacitive measurement sensors and to FIGS. 1 through 5.

Figure 2:
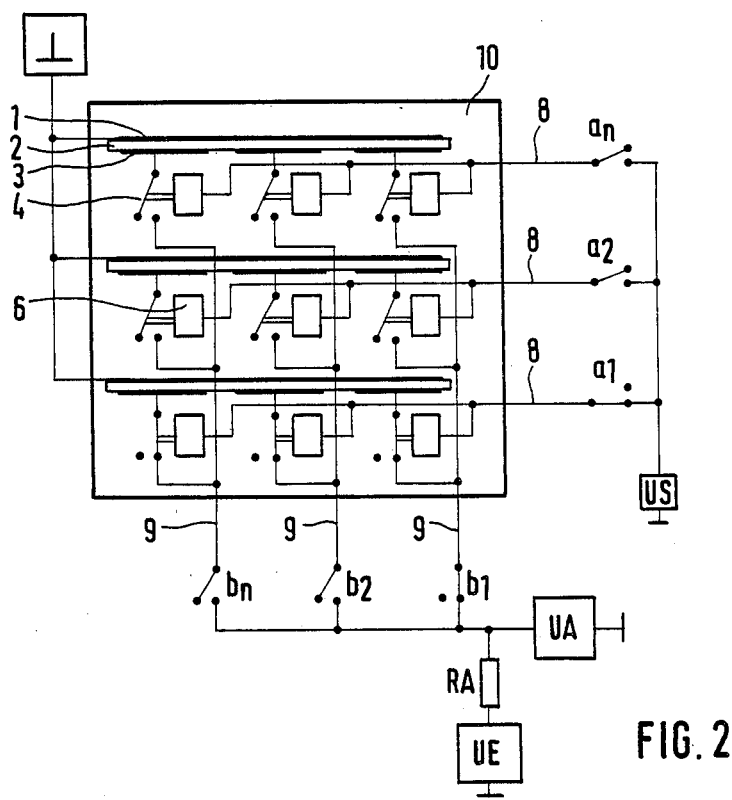
Figure 3:
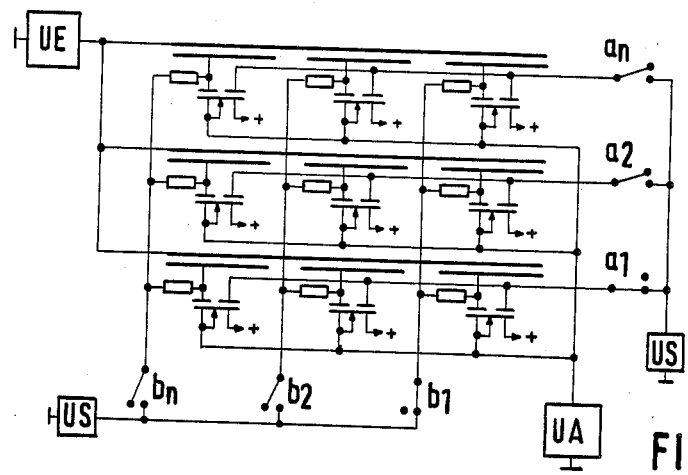
Figure 4:
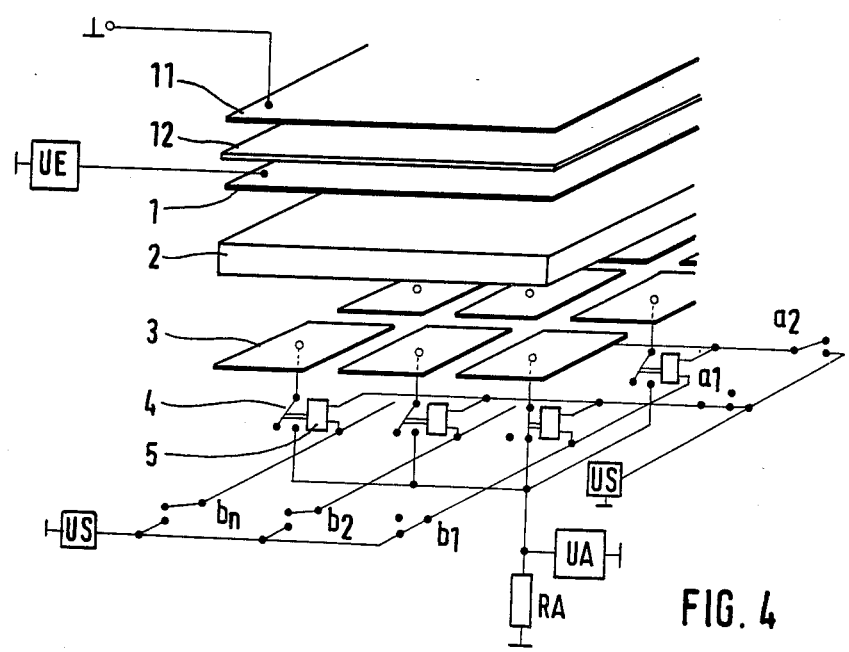
Figure 5:
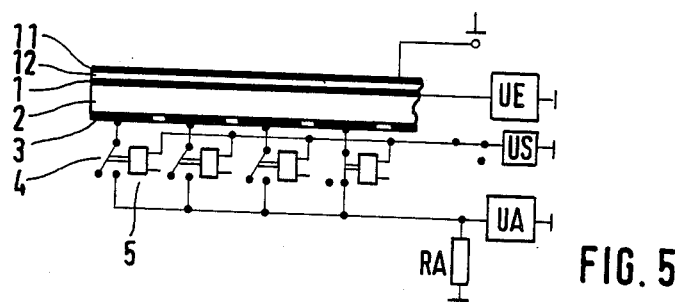

FIGS. 1, 2, and 3 illustrate electric circuits with a matrix-like distribution of measurement sensors; and FIGS. 4 and 5 illustrate the design of capacitive sensor elements and the arrangement of switches and controls.

The switches 4 arrayed in the form of a matrix in the circuitry illustrated in FIG. 1 are controlled by control devices 5. Every device 5 contains a logical AND function. Lines 8, which are arrayed in lines and rows, control switches 4 by diverting a signal US over switches a1-an and b1-bn. Thus, any switch 4 and accordingly any force sensor can be selected and polled. A signal voltage UE, which can consist of a sinusoidal voltage, is supplied to the common connections of measurement sensors 1 and picked up in the form of a measurement signal UA at an operational resistor RA through one of switches 4 and through an impedance converter 7.

Alternatively, operational resistor RA can be connected to the common connection of measurement sensors 1 or to each separate measurement point in the matrix. It is also possible to leave out impedance converter 7 and apply signal voltage UE in the other direction to the common connections of switches 4 through operational resistor RA and to connect the common connections of measurement sensors 1 to ground potential.

FIG. 2 illustrates a system wherein the switches 4 in whole lines are activated simultaneously by a control signal US through switches a1-an and through control lines 8 by means of switching devices 6. The output terminals of switches 4 are connected row by row at point 9. Signal voltage UE is supplied to the appropriate measurement sensors through operational resistor RA and through one of the switches 4. Activating switches a1-an and b1-bn makes it possible to poll the state of each measurement sensor through lines 8 and 9.

Signal voltage UE can also be applied to the common connections of measurement sensors 1 and picked up at the voltage divider consisting of operational resistor RA and the particular active measurement sensor.

Impedance converters or operational resistors RA can also be directly applied to the measurement sensors.

The circuitry illustrated in FIGS. 1 and 2 can also basically be operated without operational resistors RA and impedance converters 7 if the current strength is measured with the measurement sensors. Combinations of the circuits illustrated in FIGS. 1 and 2 are also possible.

FIG. 3 illustrates an embodiment of a circuit wherein the switches 4, the switching device 5, which has an AND characteristic, and impedance converters 7 are designed with a dual-MOS field-effect tetrode and a resistor RA.

There are various ways of controlling the switching system.

The signal voltage UE can be applied to the common connections of the measurement-sensor connections and picked up at the source connections of the tetrodes by the voltage divider that consists of the measurement sensors and of resistor RA.

It is also possible, however, to supply the signal voltage UE to control signal US through switches b1-bn over the row-shaped lines that lead to resistors RA. The AND characteristic of the switching devices and the impedance conversion will simultaneously be maintained directly at the measurement sensors, although the common measurement-sensor connections or conductive foil of the force-introduction end of measurement matrix 10 can still be applied to ground, which leads to the aforesaid advantages in the design of capacitive force-distribution measurement systems for example.

FIG. 4 is an exploded view of a capacitative measurement-sensor matrix with common measurement-sensor connections 1, whereby resilient metallized or coated sheets of plastic can be employed. Instead of an integral conductive surface, individual connected surfaces can be employed. If the plastic is connected not to signal voltage UE but to ground, an additional screening sheet 11 separated by a sheet 12 of insulation may be necessary. Sheet 1 is connected to compressible dielectric 2, which is connected in turn to the individual surfaces 3. The individual capacitors are between surfaces 3 and consist essentially of a facing and equally large surface of foil 1.

FIG. 5 is a wiring diagram of the system described with reference to FIG. 4.

The measurement sensors can consist also of pyroelectric sheets.

We claim:

1. A system for measuring force distributions with any desired number of measurement sensors arrayed in a matrix, comprising: a plurality of sensors emitting proportional electrical signals when subjected to force, said sensors being sampleable in sequence; means for connecting all said sensors together, individually, or at least in groups at one pole; controllable digital switch means located at least adjacent said sensors and means for connecting every sensor at another pole to said controllable switch means; means with input terminals and control lines combined into rows and columns for controlling said switch means from outside said matrix, the number of said control lines being substantially less than the number of sensors, said signals having all substantially the same capacitive load and being all influenced the same by noise signals.

2. A system as defined in claim 1, wherein said means with input terminals comprises a logical AND circuit having an output signal determining the switching state of said switch means, said means with input terminals having input signals applied by said control lines.

3. A system as defined in claim 1, wherein said switch means comprises individual switches connected together at a common junction.

4. A system as defined in claim 1, wherein said switch means has a switching state depending on a signal from a control line.

5. A system as defined in claim 1, wherein said switch means comprises individual switches arranged in one column and having a terminal connected to the same terminal in all other switches in said column; and auxiliary switch means for selecting said row from among others of said rows.

6. A system as defined in claim 1, including impedance converter means associated with said switch means.

7. A system as defined in claim 1, wherein said sensors comprise pressure-sensitive capacitors with a compressible dielectric.

8. A system as defined in claim 1, wherein said sensors comprise capacitors having a substantially integral conductive layer at a force-application end.

9. A system as defined in claim 8, wherein said capacitors have a side facing said force-application end, said side of said capacitors comprising separated conductive surfaces.

10. A system as defined in claim 1, wherein said switch means and said means with input terminals comprise individual elements of a dual-MOS field-effect tetrode and a resistor.

11. A system for measuring force distributions with any desired number of measurement sensors arrayed in a matrix, comprising: a plurality of sensors emitting proportional electrical signals when subjected to force, said sensors being sampleable in sequence; means for connecting all said sensors together, individually, or at least in groups at one pole; controllable digital switch means located at least adjacent said sensors and means for connecting every sensor at another pole to said controllable switch means; means with input terminals and control lines combined into rows and columns for controlling said switch means from outside said matrix, the number of said control lines being substantially less than the number of sensors, said signals having all substantially the same capacitive load and being all influenced the same by noise signals; and a source of electrical signal voltage applied to said sensors for actuating said sensors to emit said proportional electrical signals when subjected to force.

12. A system for measuring force distributions with any desired number of measurement sensors arrayed in a matrix, comprising: a plurality of sensors emitting proportional electrical signals when subjected to force, said sensors being sampleable in sequence; means for connecting all said sensors together, individually, or at least in groups at one pole; controllable digital switch means located at least adjacent said sensors and means for connecting every sensor at another pole to said controllable switch means; means with input terminals and control lines combined into rows and columns for controlling said switch means from outside said matrix, the number of said control lines being substantially less than the number of sensors, said signals having all substantially the same capacitive load and being all influenced the same by noise signals; said sensors comprising capacitors having a side facing a force-application end and comprising of separated conductive surfaces, said switch means with said means with input terminals being positioned directly below said separated conductive surfaces.

* * * * *